US010812923B2

(12) United States Patent
Briand

(10) Patent No.: US 10,812,923 B2
(45) Date of Patent: *Oct. 20, 2020

(54) IMMERSIVE MEDIA WITH MEDIA DEVICE

(71) Applicant: AT&T Intellectual Property I, L.P., Atlanta, GA (US)

(72) Inventor: Manuel Briand, Santa Monica, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/240,998

(22) Filed: Jan. 7, 2019

(65) Prior Publication Data
US 2019/0182609 A1      Jun. 13, 2019

Related U.S. Application Data

(63) Continuation of application No. 15/840,557, filed on Dec. 3, 2017, now Pat. No. 10,212,532.

(51) Int. Cl.
*H04R 5/02* (2006.01)
*H04S 7/00* (2006.01)
(Continued)

(52) U.S. Cl.
CPC .............. *H04S 7/30* (2013.01); *G06F 3/0213* (2013.01); *G06F 3/04815* (2013.01);
(Continued)

(58) Field of Classification Search
CPC ....................................................... H04R 5/02
See application file for complete search history.

(56) References Cited

U.S. PATENT DOCUMENTS 6,559,846 B1    5/2003  Uyttendaele et al.
6,795,113 B1    9/2004  Jackson et al.
(Continued)

FOREIGN PATENT DOCUMENTS

WO    2012007867 A1    1/2012
WO    2012073221 A1    6/2012
(Continued)

OTHER PUBLICATIONS

U.S. Appl. No. 15/250,261, filed Aug. 29, 2016, Inventor Manuel Briand, Title: Methods and Systems for Rendering Binaural Audio Content, pp. 1-37.
(Continued)

*Primary Examiner* — Olisha Anwah
(74) *Attorney, Agent, or Firm* — Guntin & Gust, PLC; Mark Wilinski

(57) ABSTRACT

Aspects of the subject disclosure may include, for example, a method, comprising: receiving, by a media processor including a processor, spherical audiovisual media content from a content delivery network; rendering, by the media processor, video for a point of view in the spherical audiovisual media content at a display device coupled to the media processor; receiving, from a remote control device coupled to the media processor, a control signal panning the point of view, resulting in a new field of view; and generating, by the media processor, audio signals from the spherical audiovisual media content corresponding to the new field of view, wherein the audio signals are adapted to audio reproduction equipment coupled to the media processor. Other embodiments are disclosed.

20 Claims, 8 Drawing Sheets

(51) Int. Cl.
*G06F 3/02* (2006.01)
*H04N 21/422* (2011.01)
*H04N 21/43* (2011.01)
*H04N 21/439* (2011.01)
*H04N 21/6587* (2011.01)
*H04N 21/81* (2011.01)
*G06F 3/0481* (2013.01)
*H04R 5/033* (2006.01)
*G06F 3/0354* (2013.01)
*G06F 3/0489* (2013.01)
*G06F 3/03* (2006.01)

(52) U.S. Cl.
CPC . *H04N 21/42204* (2013.01); *H04N 21/42222* (2013.01); *H04N 21/4307* (2013.01); *H04N 21/4394* (2013.01); *H04N 21/6587* (2013.01); *H04N 21/8106* (2013.01); *H04S 7/302* (2013.01); *G06F 3/0312* (2013.01); *G06F 3/03547* (2013.01); *G06F 3/0489* (2013.01); *H04R 5/033* (2013.01); *H04R 2499/15* (2013.01); *H04S 2400/01* (2013.01); *H04S 2420/01* (2013.01); *H04S 2420/11* (2013.01)

(56) References Cited

U.S. PATENT DOCUMENTS

| | | | |
|---|---|---|---|
| 7,145,947 B2 | 12/2006 | Koga | |
| 7,224,382 B2 | 5/2007 | Baker | |
| 7,583,288 B2 | 9/2009 | Uyttendaele et al. | |
| 8,875,212 B2 | 10/2014 | Rakib et al. | |
| 8,988,506 B2 | 3/2015 | Bennett et al. | |
| 9,232,274 B2 | 1/2016 | Meuninck et al. | |
| 9,272,209 B2 | 3/2016 | Van Der et al. | |
| 9,363,571 B2 | 6/2016 | Booth et al. | |
| 9,501,815 B2 | 11/2016 | Routhier | |
| 9,582,731 B1 | 2/2017 | Butko et al. | |
| 9,697,869 B2 | 7/2017 | Cosic | |
| 9,743,060 B1 | 8/2017 | Matias et al. | |
| 2002/0147991 A1 | 10/2002 | Furlan et al. | |
| 2003/0172131 A1 | 9/2003 | Ao et al. | |
| 2005/0062869 A1 | 3/2005 | Zimmermann et al. | |
| 2012/0098925 A1 | 4/2012 | Dasher et al. | |
| 2012/0162362 A1* | 6/2012 | Garden | H04N 13/366 348/42 |
| 2016/0012855 A1 | 1/2016 | Krishnan | |
| 2016/0044305 A1 | 2/2016 | Kim et al. | |
| 2016/0165294 A1 | 6/2016 | James | |
| 2016/0286329 A1 | 9/2016 | Grosche et al. | |
| 2016/0345001 A1 | 11/2016 | Baek et al. | |
| 2016/0353130 A1 | 12/2016 | Hwang et al. | |
| 2017/0013327 A1 | 1/2017 | Choi et al. | |
| 2017/0026686 A1 | 1/2017 | Glazier et al. | |
| 2017/0064373 A1 | 3/2017 | Kirby | |
| 2017/0111633 A1 | 4/2017 | Kang et al. | |
| 2017/0270635 A1 | 9/2017 | Chun et al. | |
| 2017/0347219 A1 | 11/2017 | Mccauley et al. | |
| 2018/0124315 A1 | 5/2018 | Fink et al. | |
| 2018/0130497 A1 | 5/2018 | Mccauley et al. | |
| 2018/0146216 A1 | 5/2018 | Chang et al. | |

FOREIGN PATENT DOCUMENTS

| | | |
|---|---|---|
| WO | 2013121823 A1 | 8/2013 |
| WO | 2013159702 A1 | 10/2013 |

OTHER PUBLICATIONS

"Set Top Box: Market Overview", Hisilicon, hisilicon.com, accessed: Oct. 2017., 1-3.

Codina, Marc et al., "Implementing the Complete Chain to Distribute Interactive Multi-stream Multi-view Real-Time Life Video Content", Applications and Usability of Interactive TV. Springer, Cham, 2015., 255-262.

O'Neal, William, "YouTube Update Brings 360 Video to SHIELD Android TV", nvidia, shield.nvidia.com, Jul. 24, 2017., 1-7.

* cited by examiner

100

201

300

IMMERSIVE MEDIA WITH MEDIA DEVICE

CROSS REFERENCE TO RELATED APPLICATIONS

This application is a continuation of U.S. patent application Ser. No. 15/840,557 filed on Dec. 13, 2017. All sections of the aforementioned application are incorporated by reference herein in its entirety.

U.S. patent application Ser. No. 15/250,261, filed Aug. 29, 2016, by Briand, entitled "Methods and Systems for Rendering Binaural Audio Content." All sections of the aforementioned application are incorporated by reference herein in its entirety.

FIELD OF THE DISCLOSURE

The subject disclosure relates to immersive media, also known as 360-degree or spherical video (hereinafter, "spherical audiovisual media"). In particular, the subject disclosure relates to delivery and rendering spherical audiovisual media via a set top box.

BACKGROUND

Spherical audiovisual media is typically recorded using either a special rig of multiple cameras/microphones. Alternatively, spherical audiovisual media can be recorded using a dedicated camera that contains multiple camera lenses embedded into the device, and filming overlapping angles simultaneously. Through a method known as video stitching, separate footage can be merged together into spherical audiovisual media. The color and contrast of each frame can be calibrated for consistency with adjacent frames that are stitched together. This stitching process may be performed by the camera itself, or using specialized video editing software that can analyze common visuals and audio to synchronize and link the different camera feeds together.

Spherical audiovisual media can be formatted in various types of projections, e.g., equirectangular, cubic, polygonal, etc. The spherical audiovisual media can be either monoscopic, with one image directed to both eyes, or stereoscopic, viewed as two distinct images directed individually to each eye for a 3D effect, thereby enabling the perception of depth.

Spherical audiovisual media are typically viewed via personal computers, mobile devices such as smartphones, or dedicated head-mounted displays. Users can pan around the video by using touch control, e.g., clicking and dragging, or by using the sensors of a device. For example, on smartphones, internal sensors such as the gyroscope are used to pan the video based on the orientation of the device. Taking advantage of this behavior, stereoscope-style enclosures for smartphones can be used to view spherical audiovisual media in an immersive format similar to virtual reality. The phone display is viewed through lenses contained within the enclosure, as opposed to virtual reality headsets that contain their own dedicated displays. Additionally, unlike spherical audiovisual media, virtual reality affords the user with the ability to control their position relative to the virtual scene, as well as panning the view. With spherical audiovisual media, the location is fixed to the camera, thus the panning is limited to the camera angles recorded.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for rendering spherical audiovisual media content in a home theater. Other embodiments are described in the subject disclosure.

One or more aspects of the subject disclosure include a media processor, comprising: a processing system including a processor; and a memory that stores executable instructions that, when executed by the processing system, facilitate performance of operations, the operations comprising: receiving spherical audiovisual media content from a content delivery network; displaying video for a point of view in the spherical audiovisual media content at a display device coupled to the media processor; rendering audio signals corresponding to the point of view from the spherical audiovisual media content, wherein the audio is adapted to audio reproduction equipment coupled to the media processor; receiving, from a remote control device coupled to the media processor, a request to pan the point of view, resulting in a new field of view; displaying video for the new field of view from the spherical audiovisual media content at the display device; and modifying the audio signals based on the new field of view.

One or more aspects of the subject disclosure include a machine-readable storage medium, comprising executable instructions that, when executed by a media processor including a processor, facilitate performance of operations, the operations comprising: receiving spherical audiovisual media content from a content delivery network; displaying video for a point of view in the spherical audiovisual media content at a display device coupled to the media processor; receiving, from a remote control device coupled to the media processor, a request to pan the point of view, resulting in a new field of view; displaying video for the new field of view from the spherical audiovisual media content at the display device; and generating audio signals corresponding to the new field of view from the spherical audiovisual media content, wherein the audio signals are adapted to audio reproduction equipment coupled to the media processor.

One or more aspects of the subject disclosure include a method, comprising: receiving, by a media processor including a processor, spherical audiovisual media content from a content delivery network; rendering, by the media processor, video for a point of view in the spherical audiovisual media content at a display device coupled to the media processor; receiving, from a remote control device coupled to the media processor, a control signal panning the point of view, resulting in a new field of view; and generating, by the media processor, audio signals from the spherical audiovisual media content corresponding to the new field of view, wherein the audio signals are adapted to audio reproduction equipment coupled to the media processor.

Figure 1:
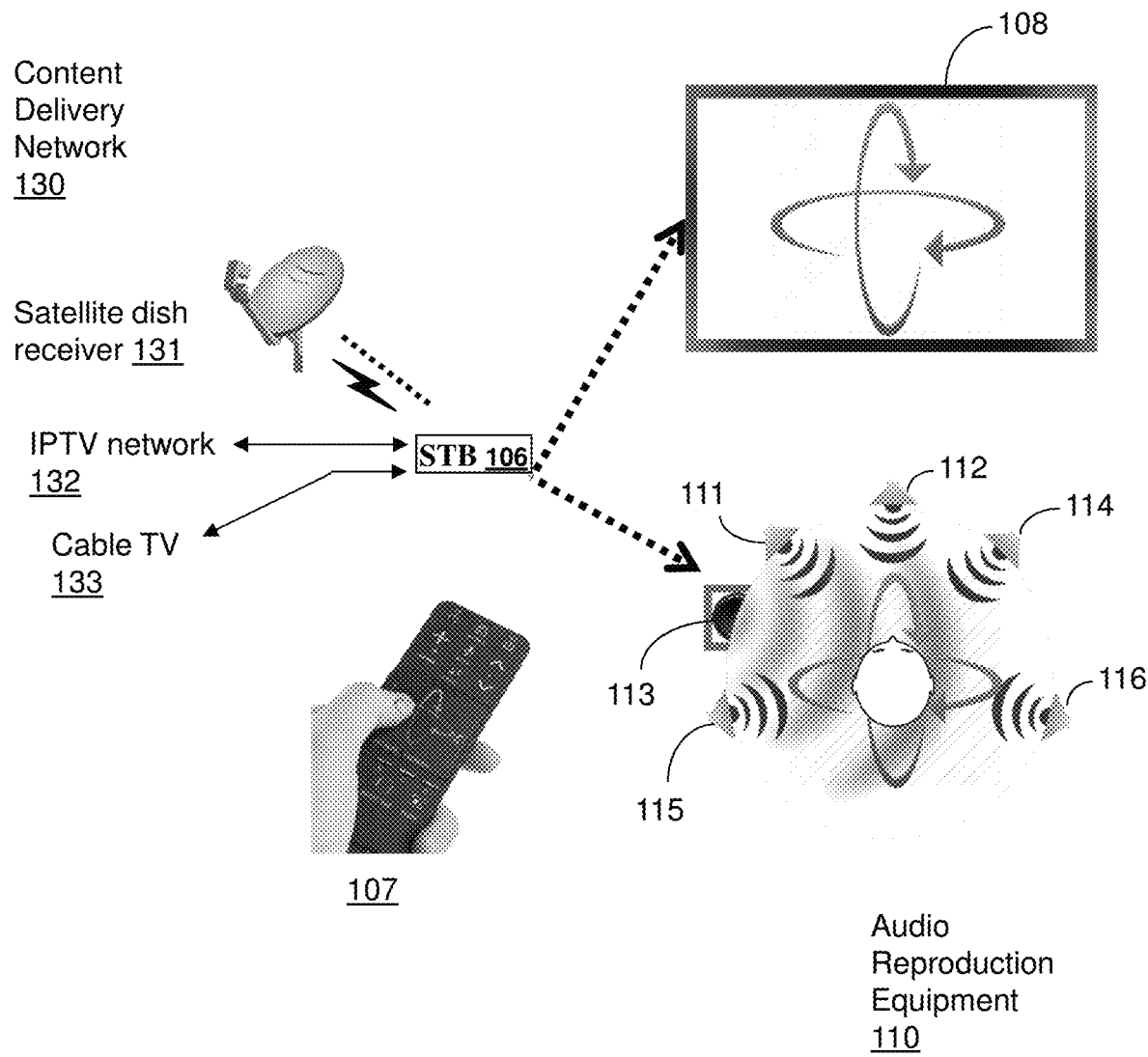
FIG. 1 depicts an illustrative embodiment of a system for rendering spherical audiovisual media.

FIG. 1 depicts an illustrative embodiment of a system for rendering spherical audiovisual media. System 100 includes a media processor 106, a remote control 107, a display device 108, and audio reproduction equipment 110. In an embodiment, system 100 is utilized in a home television environment. Media processor 106 may comprise a set-top box, which may include a processing system that processes received spherical audiovisual media content and provides signals to display device 108 and audio reproduction equipment 110, thereby supporting immersive audiovisual presentations.

In an embodiment, remote control 107 may comprise a track pad to enable interactive navigation in an audiovisual scene. In an embodiment, remote control 107 comprises up, down, left and right buttons to indicate which direction to pan content. In other embodiments, remote control 107 may comprise a joystick or track ball.

Display device 108 may comprise a standard definition display, a high definition (HD) display, a three-dimensional (3D) display, an ultra-high definition (UHD or 4K) display, or the like.

In an embodiment, audio reproduction equipment 110 may comprise headphones. Headphones have two speakers, each fitting onto or into an ear of the user, and can be supplied with audio content in a two channel format for an enhanced listening experience by the user. In some embodiments, the media processor 106 converts the audio content in the spherical audiovisual media content to audio content in a two channel format. For example, a binaural audio format is the result of converting six channel sound format to a two channel audio format. In some embodiments, converting audio content in a six channel sound format to a binaural audio format takes into account the type of audio content carried on each channel of the audio in the six channel sound format. For example, the media processor 106 may provide less sound enhancement for dialogue audio on the center channel to perceive the dialog close to the user 102, thereby enhancing the listening experience. Further, the binaural audio format provides sound enhancement, which provides a perception to the user that the sound is provided outside the headphones thereby mimicking or otherwise simulating surround sound, as set forth in more detail below.

In an embodiment, audio reproduction equipment 110 comprises, for example, loudspeakers that are either built into a television set, or are present in a sound bar or a multichannel audio system with various configurations, including stereo, 5.1, 7.1, 5.1+2, 5.1+4, 7.1+2, 7.1+4, or up to 9.1+6 speakers. An exemplary 9.1+6 immersive sound bar can be found at https://www.sony.com/electronics/sound-bars/ht-st5000, which is incorporated by reference herein. An exemplary 9.1+6 speaker multichannel audio system can be found at http://www.klipsch.com/dolby-atmos-speakers, which is incorporated by reference herein. In an embodiment illustrated in FIG. 1, a 5.1 multichannel surround sound system, including front left 111, center 112 and right 114 speakers, a subwoofer 113, and left 115 and right 116 surround sound speakers. In one or more embodiments, a six channel sound format for audio content in the spherical audiovisual media content can carry different types of audio on different channels. For example, the audio content can be associated with media content such as an action movie. The center channel can carry dialogue of a scene in the media content, while the left channel and right channel can carry the ambient noise for the scene (e.g. birds chirping, cars passing, etc.). Further, the left surround channel, the right surround channel, and the low frequency effects channel can carry the music associated with the scene. In some embodiments, music associated with the left surround sound channel, right surround sound channel, and low frequency effects channel may be provided with more audio enhancement. Thus, in one or more embodiments, the media processor 106 detects the audio content type on each audio content channel of the audio content in six channel sound format and determines the amount of sound enhancement when rendering the audio content in another audio format.

In other embodiments, audio reproduction equipment 110 may comprise a 2.1 channel stereo sound bar with remote subwoofer, a 7.1 channel surround sound system, or other combinations. In an embodiment, media processor 106 adapts the audio content in the spherical audiovisual media content to match the audio reproduction equipment 110. In some embodiments, media processor 106 can render or re-render the audio content in an audio format according the user inputted amount or a direction to increase or decrease the amount of sound enhancement. In further embodiments, the user can provide a default setting or value for sound enhancement through the user interface. In other embodiments, personnel of a media content provider can configure the amount of sound enhancement for audio associated with media content for playback on audio reproduction equipment 110.

System 100 receives spherical audiovisual media content from a content delivery network 130. Content delivery network 130 may comprise a satellite dish receiver 131, an internet protocol television system (IPTV) network 132, a cable TV network 133, or a combination thereof. In an embodiment, the spherical audiovisual media may include an International Standards Organization (ISO) Motion Picture Experts Group (MPEG) MPEG-4 container with compressed standard H.264/H.265 video data and either compressed AAC audio format, Dolby AC3/EAC3/AC4, DTS-HD, DIS-X or MPEG-H formatted audio data. In an embodiment, the video format can be stereoscopic, comprising top and bottom views. In an embodiment, the audio format can be a first order Ambisonics or high order Ambisonics format, with at least four (4) audio channels. Metadata describing the video and audio formats may be included within the MPEG-4 container. Further, the media processor 106, or the content delivery network 130 can re-render the audio content in an audio format compatible with playback on the audio reproduction equipment. Network conditions can include the capacity of the content delivery network 130 in terms of either bandwidth or bit rate, latency or delay, noise or distortion, and/or jitter caused by the content delivery network 130 on data flowing through the content delivery network 130.

In an exemplary embodiment, system 100 may receive spherical audiovisual media content from the content delivery network 130 comprising a symphony orchestra presentation. System 100 may render a view on display device 108 of the entire orchestra on stage, from the point of view of an audience member in the gallery. A user of system 100 may adjust the view to zoom in and get a close-up view of the orchestra. The user of system 100 may further adjust the view, by using a track pad on the remote control 107 to pan over so that the field of view comprises the woodwind section of the orchestra. In addition to rotating the audio output in synchronicity with the panned field of view, system 100 may enhance the sound of the woodwind section being presented in the field of view, thereby providing a better user experience, and more engaging and interactive media content. For example, the user can interact with the scene and becomes fully immersed in the scene. Such user experience is achieved without requiring the user to wear a headset or virtual reality goggles to enjoy spherical audiovisual media content and to interact with the content.

In one or more embodiments, the spherical audiovisual media content can carry different types of audio on different channels. For example, the media content received from the content delivery network 130 can be a film with mostly dialogue. Such audio content associated with the media content can have more than one channel carry dialogue while other channels carry ambient noise (e.g. birds chirping, cars passing, etc.) or music for a scene. The media processor 106 may provide less sound enhancement for the dialogue audio on the different channels to enhance the user's listening experience. In other embodiments, and ambient noise and music associated with the other channels may be provided with more sound enhancement. Thus, in one or more embodiments, the media processor detects the audio content type on each audio content channel of the spherical audiovisual media content and determines the amount of sound enhancement when rendering the audio content for the audio reproduction equipment.

In one or more embodiments, a user can configure the amount of sound enhancement manually through a user interface on media processor 106. Further, the user can provide a default setting or value for sound enhancement or externalization through the user interface. In some embodiments, personnel of a media content provider can configure the amount of sound enhancement or externalization for audio associated with media content for playback by media processor 106. Such configuring of the sound enhancement can be done by the content delivery network 130 and provided in metadata associated with the spherical audiovisual media content.

Figure 2A:
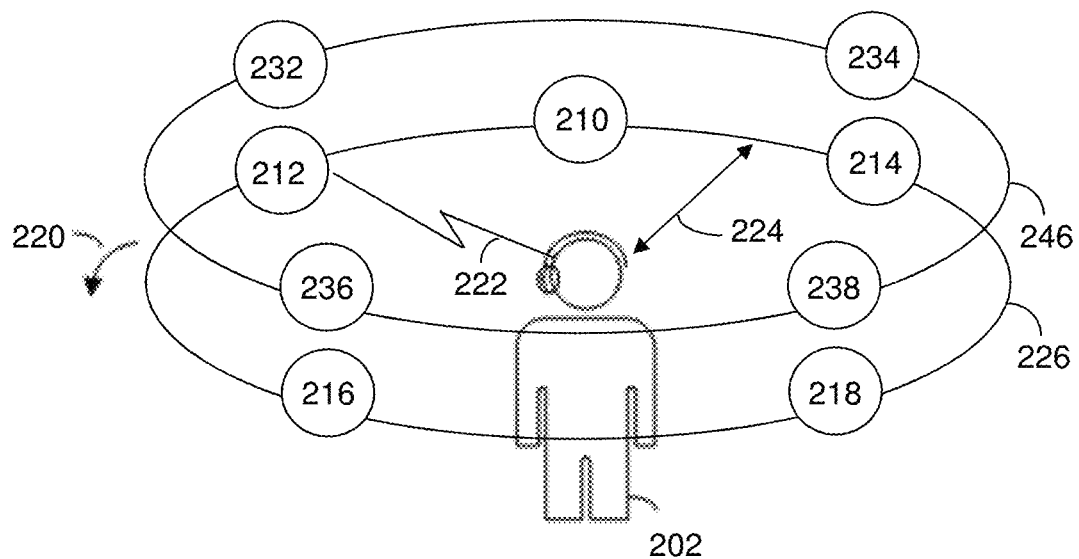
FIGS. 2A and 2B depict perspective and side views for an illustrative embodiment of a system for rendering binaural audio content from spherical audiovisual media.

FIG. 2A depicts an illustrative embodiment of a perspective view of a system 200 for rendering binaural audio content from spherical audiovisual media for a mobile environment using headphones. When rendering the binaural audio content from a six channel sound format (5.1 audio), or from a first order or high order Ambisonics format, sound enhancement or externalization is used to provide a perception to a user 202 that the sound is provided outside headphones 204 thereby mimicking or simulating surround sound. Sound externalization is provided using digital signal filtering and processing techniques that include filters based on one or more Head Related Transfer Functions (HRTFs) and/or one or more Binaural Room Impulse Response (BRIR) filters. Thus, the sound externalization provides a perception to the user 202 that there are at least five speakers 210, 212, 214, 216, 218 around the head of the user 202 in the horizontal plane 226, as well as possibly two more height speakers at the front left 232 and right 234 sides above the horizontal plane 226 (5.1+2), or two additional speakers at the rear left 236 and right 238 sides above the horizontal plane 226 (5.1+4), and maybe even two more middle height front left and right speakers (5.1+6, not illustrated).

Figure 2B:
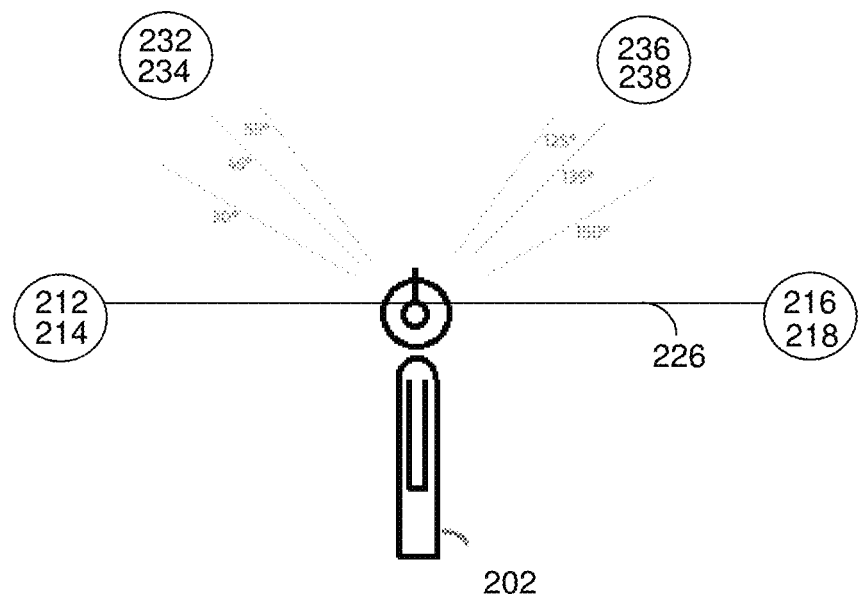

FIG. 2B provides a side view of system 200 for rendering binaural audio content from spherical audiovisual media for a mobile environment using headphones. As shown in FIG. 2B, front left and right height speakers 232, 234 are positioned above the listener, preferably at a 45 degree angle, but can be in a range from 30 degrees to 55 degrees. Rear left and right height speakers 236, 238 are positioned above the listener, preferably at a 1355 degree angle, but can be in a range from 125 degrees to 150 degrees.

The BRIR filters provides a perceived position 220 of a speaker 212 while the HRTF filters provides the perceived direction 222 from which the sound is perceived from a speaker 212. Traditionally, media content producers provide predefined HRTF and BRIR filters to render audio content into a binaural audio format, and spherical audiovisual media content may include predefined HRTF and BRIR metadata. In each predefined set of filters, the perception each speaker 210, 212, 214, 216, 218, 232, 234, 236, 238 is a same radial distance 224 along a circle 226 around the user 202. Each different predefined set of filters can have the speakers 210, 212, 214, 216, 218, 232, 234, 236, 238 at different radial distance from the user 202. Thus, if the audio content that is being rendered is for a movie with a significant amount of dialog, then the one set of predefined filters may be used for rendering allow for sound externalization such that all the perceived speakers have a short radial distance 224. However, if the audio content that is being rendered is for an action movie with a significant amount of surround sound, then another set of the predefined filters that may be used for rendering allow for sound externalization such that all the perceived speakers 210, 212, 214, 216, 218, 232, 234, 236, 238 are at a circle 226 or heightened circle 246 with a long radial distance 224.

HRTFs have been found by persons of ordinary skill in the art based on measurements of audio signals (i.e. head related impulse responses) from speakers to a user in a laboratory environment. The Center for Image Processing and Integrated Computing (CIPIC) has created a database for HRTF functions (see http://interface.cipic.ucdavis.edu/sound/hrtf.html). The database is described in the article V. R. Algazi, R. O. Duda, D. M. Thompson and C. Avendano, "The CIPIC HRTF Database," Proc. 2001 IEEE Workshop on Applications of Signal Processing to Audio and Electroacoustics, pp. 99-102, Mohonk Mountain House, New Paltz, N.Y., Oct. 21-24, 2001 which is incorporated by reference in its entirety herein. Different HRTF filters can be applied to audio content carried by different channels and received in six channel sound format to render the audio content in binaural audio format. Further, BRIR filters can also be applied to different channels of audio content received in six channel sound format to render the audio content in binaural audio format. Examples of BRIR filters can be found in R. Crawford-Emery and H. Lee, "The Subjective Effect of BRIR Length Perceived Headphone Sound Externalisation and Tonal Colouration," Audio Engineering Society, 136$^{th}$ Convention, Paper 9044, pp. 1-9, Berlin, Germany, April 26-29, 2014, which is incorporation by reference in its entirety herein.

In addition, filters that process the audio content of the different channels in six channel sound format can include both HRTFs and BRIR. Such combined HRTF and BRIR filters can be called Combined Head and Room Impulse Response (CHRIR). The transfer functions for CHRIR can be measured in the laboratory and be used as filters in rendering audio content from a multi-channel sound format (e.g. six channel surround sound format) into audio content in a binaural audio format. See article S. Mehrotra, W. Chen, and Z. Zhang, "Interpolation of Combined Head and Room Impulse Response for Audio Spatialization," pp. 1-6, IEEE 13th International Workshop on Multimedia Signal Processing, Hangzhou, China, Oct. 17-19, 2011, which is incorporated by reference in its entirety herein. An example CHRIR transfer function can be expressed as:

$$y_l[n] = \sum_{i=0}^{N-1} \sum_{k=0}^{L-1} h_{i,l}[k] x_i[n-k] \quad (1)$$

$$y_r[n] = \sum_{i=0}^{N-1} \sum_{k=0}^{L-1} h_{i,r}[k] x_i[n-k] \quad (2)$$

Where $x_i$ is the ith sound source (–0, 1, . . . , N–1), $h_{i,l}$ is the CHRIR of length L (transfer function in time/discrete domain) from the location of source i to the left of the listener, and $h_{i,r}$ be the CHRIR to the right ear. The CHRIR is the combination of the HRTF and RIR and is measured from particular sound locations for a given room. The left and right channels of the output signal are denoted by $y_l$ and $y_r$.

Figure 2C:
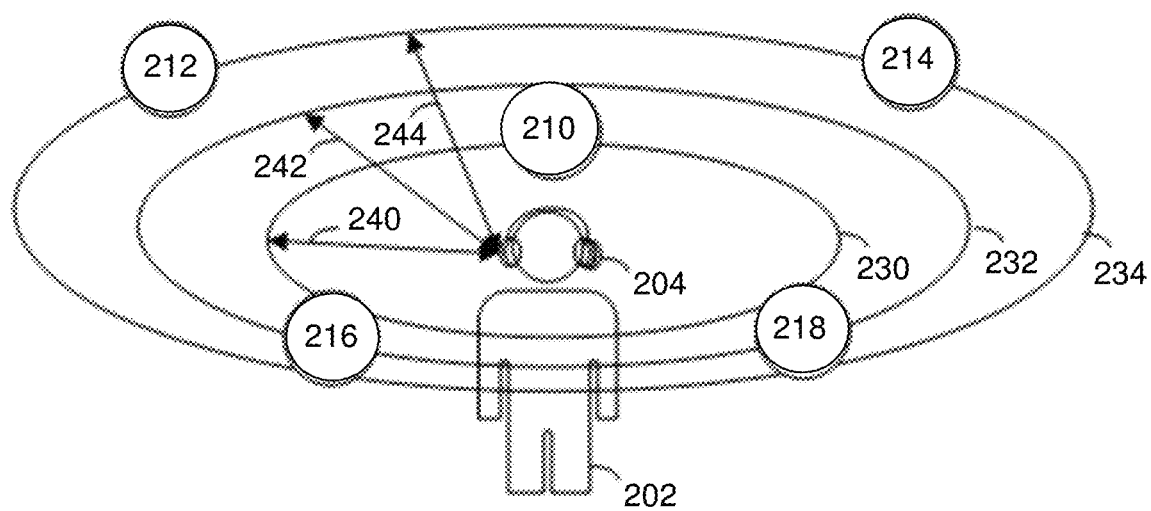
FIG. 2C depicts an illustrative embodiment of a system for rendering binaural audio content from spherical audiovisual media.

FIG. 2C depicts an illustrative embodiment of a system 201 for rendering binaural audio from spherical audiovisual media content. The HRTF, BRIR, and/or CHRIR filters used in system 201 allow for sound externalization such that each perceived speaker, in this case illustrated as a 5.1 system with five perceived speakers 210, 212, 214, 216, 218 can be on a circle 230, 232, 234 with a different radial distance 240, 242, 244 from the user 202 listening to the audio content through the headphones 204. Likewise, additional height perceived speakers (not illustrated) can be set at different radial distances from the listener. The type of filters may depend on the audio bit rate, compression ratio, type of content on each channel, or the type of headphones (or playback audio device). For example, the system 201 may render spherical audiovisual media content from a six channel sound format to a binaural audio format. The audio content may be a movie with a car chase. The runaway car can have two people having a dialog with each other. Such a scene can include police cars chasing the runaway car. Also, there may be screaming bystanders running away from the car chase. The center channel of the six channel sound format carries dialog of the two passengers in the runaway car. Based on this type of audio content on the center channel, the filters may process the audio content of the center channel with little or no sound externalization because it would provide a better listening experience if the dialog was perceived to be heard from in front of the user (or even perceived inside the head of the user 202). Thus, the dialog from perceived center speaker 210 can be on the circle 230 with the shortest radial distance 240 from the user. In addition, the left-front channel and right-front channel of the audio content in six channel sound format can carry the sounds of screaming bystanders. Such type of audio content can be filtered with sound externalization such that the screams from the perceived speakers 212, 214 are on the circle 234 at a radial distance 244 that is farther away from the user 202. As the user changes the field of view to include the screaming person, the screams from the perceived speaker 212, for example, may be moved to a closer circle 232, 230 having a smaller radius 242 or 240. Further, the left-rear channel and right-rear channel of the audio content in six channel sound format can carry the sounds of police sirens. This type of audio content can be filtered with some sound externalization such that the perceived speakers 216, 218 are at the circle 232 at a radial distance 242 between the farthest circle 234 and the nearest circle 230.

Figure 3:
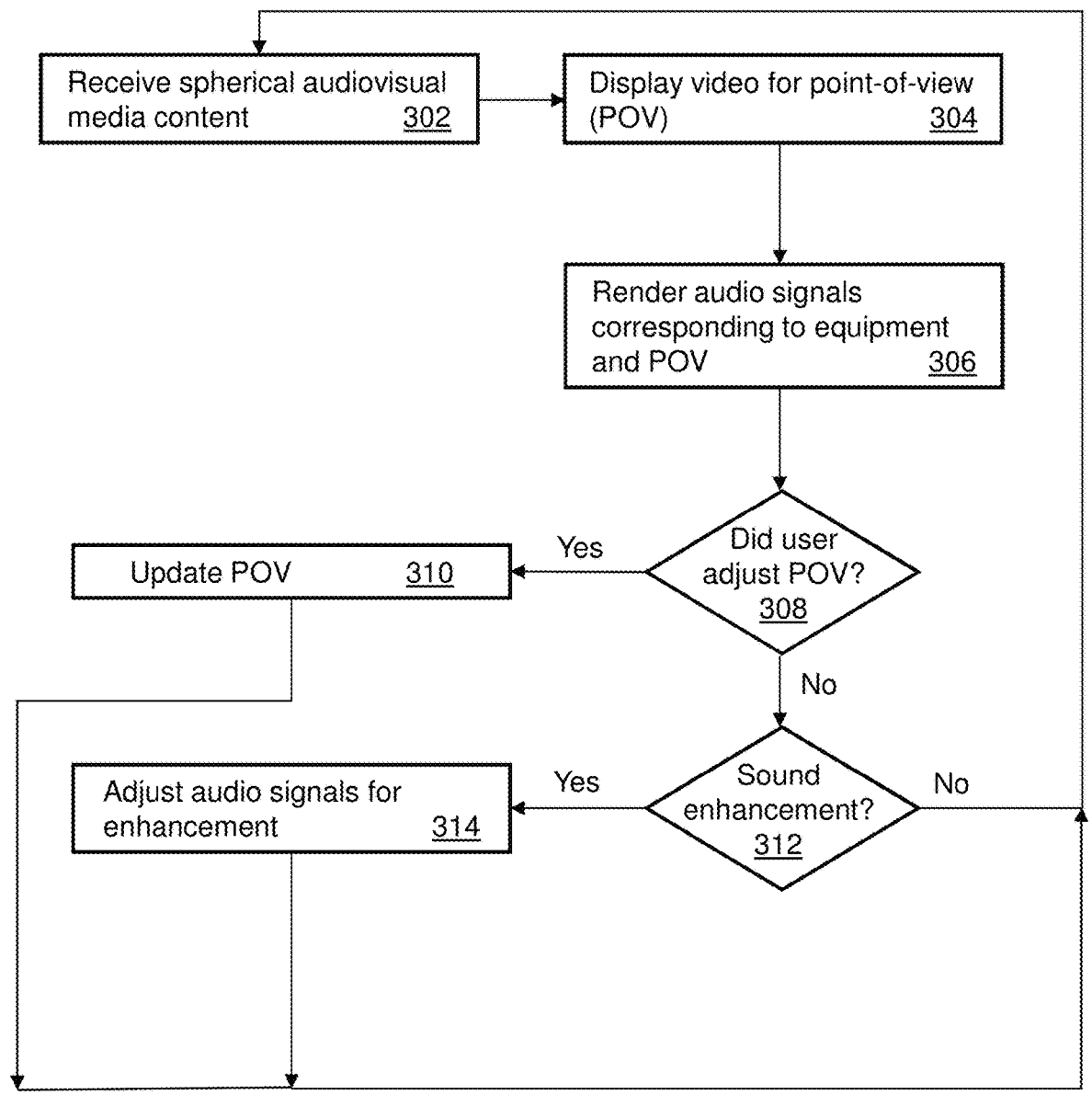
FIG. 3 depicts an illustrative embodiment of a method used in portions of the system described in FIGS. 1, 2A and 2B.

FIG. 3 depicts an illustrative embodiment of a process used by media processor 106 in system 100. As shown in FIG. 3, in step 302, the media processor receives spherical audiovisual media content from a content delivery network. Next, in step 304, the media processor displays video for the scene in the spherical audiovisual media content for a point-of-view (POV) at a display device coupled to the media processor. The initial POV may be set by default by the user, or may be present in metadata of the spherical audiovisual media content. Next, in step 306, the media processor renders audio signals corresponding to the POV from audio data in the spherical audiovisual media content. The media processor adapts the audio to audio reproduction equipment coupled to the media processor.

Next, in step 308, the media processor checks whether the user has adjusted the POV. The user may adjust the POV by panning, for example, moving the view left, right, up or down, or by zooming in or out, using a remote control device coupled to the media processor. Adjusting the POV will result in a new field-of-view. If the user adjusted the POV, then the process continues at step 310, where the POV is adjusted to the new field of view. The process continues back to step 302, to repeat receiving spherical audiovisual media content, displaying video based on the updated POV, and rendering audio based on the updated POV.

If the user did not adjust the POV, then the process continues at step 312, where the media processor checks whether sound should be enhanced. Sound enhancement may be provided for in metadata of the spherical audiovisual media content itself, in user selected defaults in the media processor, or as a result of a new field of view, as set forth in more detail above. If sound enhancement should be invoked, then the process continues at step 314, where the media processor adjusts the audio signals to enhance the sound according to the enhancement. In either case, the process repeats itself at step 302 as more spherical audiovisual media content is received.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
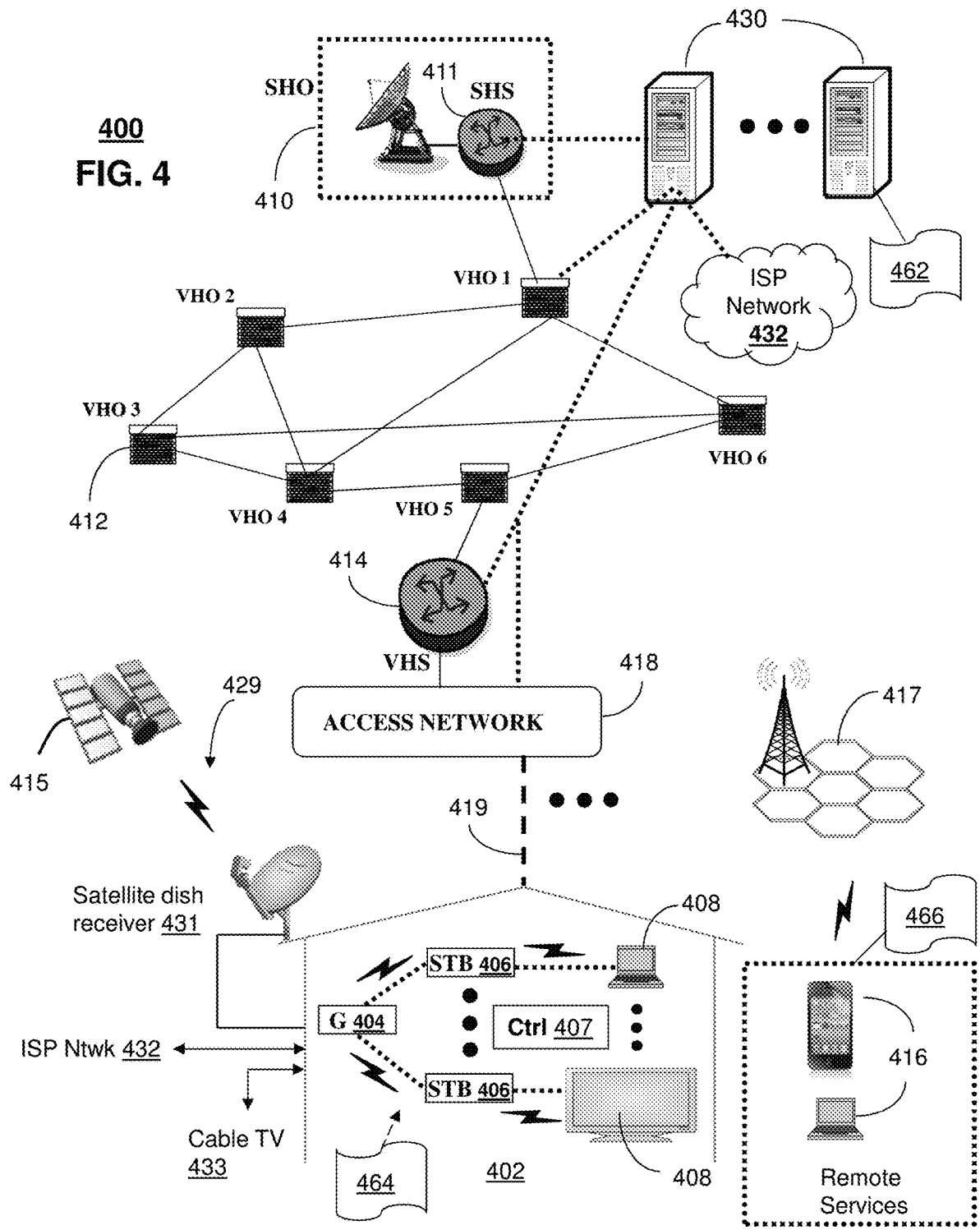
FIGS. 4-5 depict illustrative embodiments of communication systems that provide content delivery media services to the systems of FIGS. 1, 2A and 2B.

FIG. 4 depicts an illustrative embodiment of a communication system 400 for providing various communication services, such as delivering media content. The communication system 400 can represent an interactive media network, such as an interactive television system (e.g., an IPTV media system). Communication system 400 can be overlaid or operably coupled with content delivery network 130 and/or interfaced with system 100 of FIGS. 1 and/or 2A and 2B as another representative embodiment of communication system 400. For instance, communication system 400 can provide spherical audiovisual media content to system 100. Additionally, one or more devices illustrated in the communication system 400 of FIG. 4 may be representative of one or more devices present in system 100, such as media processor 106, remote control 107, or display device 108, as set forth in more detail below as media processor 406, remote controller 407, or media devices 408.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, spherical audiovisual media content and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, ZigBee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a content delivery network (herein referred to as CDN 430). The CDN 430 can use computing and communication technology to perform function 462, which can include among other things, the media processor techniques described by method 300 of FIG. 3. For instance, function 462 of server 430 can be similar to the functions described for content delivery network 130 of FIG. 1 in accordance with method 300. The media processors 406 and wireless communication devices 416 can be provisioned with software functions 464 and 466, respectively, to utilize the services of CDN 430. For instance, functions 464 and 466 of media processors 406 and wireless communication devices 416 can be similar to the functions described for the media processor 106 of FIG. 1 in accordance with method 300.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
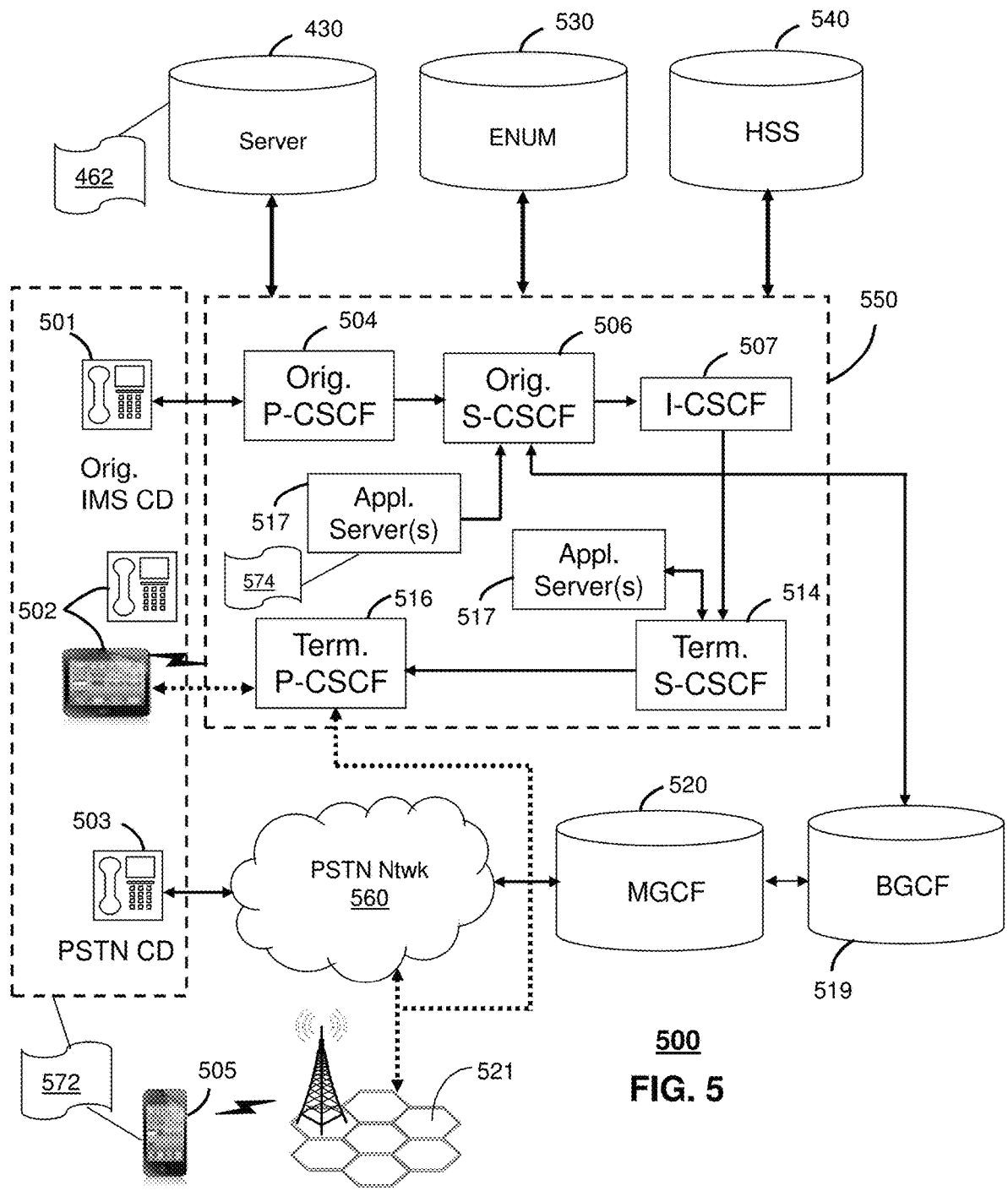

FIG. 5 depicts an illustrative embodiment of a communication system 500 employing an IP Multimedia Subsystem (IMS) network architecture to facilitate the combined services of circuit-switched and packet-switched systems. Communication system 500 can be overlaid or operably coupled with system 100 of FIGS. 1 and/or 2A and 2B and communication system 400 as another representative embodiment of communication system 400. In an embodiment, a media processor, comprising a processing system including a processor; and a memory that stores executable instructions that, when executed by the processing system, facilitate performance of operations, the operations comprising: receiving spherical audiovisual media content from a content delivery network, such as system 500.

Communication system 500 can comprise a Home Subscriber Server (HSS) 540, a tElephone NUmber Mapping (ENUM) server 530, and other network elements of an IMS network 550. The IMS network 550 can establish communications between IMS-compliant communication devices (CDs) 501, 502, Public Switched Telephone Network (PSTN) CDs 503, 505, and combinations thereof by way of a Media Gateway Control Function (MGCF) 520 coupled to a PSTN network 560. The MGCF 520 need not be used when a communication session involves IMS CD to IMS CD communications. A communication session involving at least one PSTN CD may utilize the MGCF 520.

IMS CDs 501, 502 can register with the IMS network 550 by contacting a Proxy Call Session Control Function (P-CSCF) which communicates with an interrogating CSCF (I-CSCF), which in turn, communicates with a Serving CSCF (S-CSCF) to register the CDs with the HSS 540. To initiate a communication session between CDs, an originating IMS CD 501 can submit a Session Initiation Protocol (SIP INVITE) message to an originating P-CSCF 504 which communicates with a corresponding originating S-CSCF 506. The originating S-CSCF 506 can submit the SIP INVITE message to one or more application servers (aSs) 517 that can provide a variety of services to IMS subscribers.

For example, the application servers 517 can be used to perform originating call feature treatment functions on the calling party number received by the originating S-CSCF 506 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 506 can submit queries to the ENUM system 530 to translate an E.164 telephone number in the SIP INVITE message to a SIP Uniform Resource Identifier (URI) if the terminating communication device is IMS-compliant. The SIP URI can be used by an Interrogating CSCF (I-CSCF) 507 to submit a query to the HSS 540 to identify a terminating S-CSCF 514 associated with a terminating IMS CD such as reference 502. Once identified, the I-CSCF 507 can submit the SIP INVITE message to the terminating S-CSCF 514. The terminating S-CSCF 514 can then identify a terminating P-CSCF 516 associated with the terminating CD 502. The P-CSCF 516 may then signal the CD 502 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 5 may be interchangeable. It is further noted that communication system 500 can be adapted to support video conferencing. In addition, communication system 500 can be adapted to provide the IMS CDs 501, 502 with the multimedia and Internet services of communication system 400 of FIG. 4.

If the terminating communication device is instead a PSTN CD such as CD 503 or CD 505 (in instances where the cellular phone only supports circuit-switched voice communications), the ENUM system 530 can respond with an unsuccessful address resolution which can cause the originating S-CSCF 506 to forward the call to the MGCF 520 via a Breakout Gateway Control Function (BGCF) 519. The MGCF 520 can then initiate the call to the terminating PSTN CD over the PSTN network 560 to enable the calling and called parties to engage in voice and/or data communications.

It is further appreciated that the CDs of FIG. 5 can operate as wireline or wireless devices. For example, the CDs of FIG. 5 can be communicatively coupled to a cellular base station 521, a femtocell, a WiFi router, a Digital Enhanced Cordless Telecommunications (DECT) base unit, or another suitable wireless access unit to establish communications with the IMS network 550 of FIG. 5. The cellular access base station 521 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 5.

Cellular phones supporting LTE can support packet-switched voice and packet-switched data communications and thus may operate as IMS-compliant mobile devices. In this embodiment, the cellular base station 521 may communicate directly with the IMS network 550 as shown by the arrow connecting the cellular base station 521 and the P-CSCF 516.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The CDN 430 of FIG. 4 can be operably coupled to communication system 500 for purposes similar to those described above. CDN 430 can perform function 462 and thereby provide spherical audiovisual media content delivery services to the CDs 501, 502, 503 and 505 of FIG. 5 similar to the functions described for content delivery network 130 of FIG. 1 in accordance with method 300 of FIG. 3. CDs 501, 502, 503 and 505, which can be adapted with software to perform function 572 to utilize the services of the CDN 430 similar to the functions described for media processor 106 of FIG. 1 in accordance with method 300 of FIG. 3. CDN 430 can be an integral part of the application server(s) 517 performing function 574, which can be substantially similar to function 462 and adapted to the operations of the IMS network 550.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as 3$^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 6:
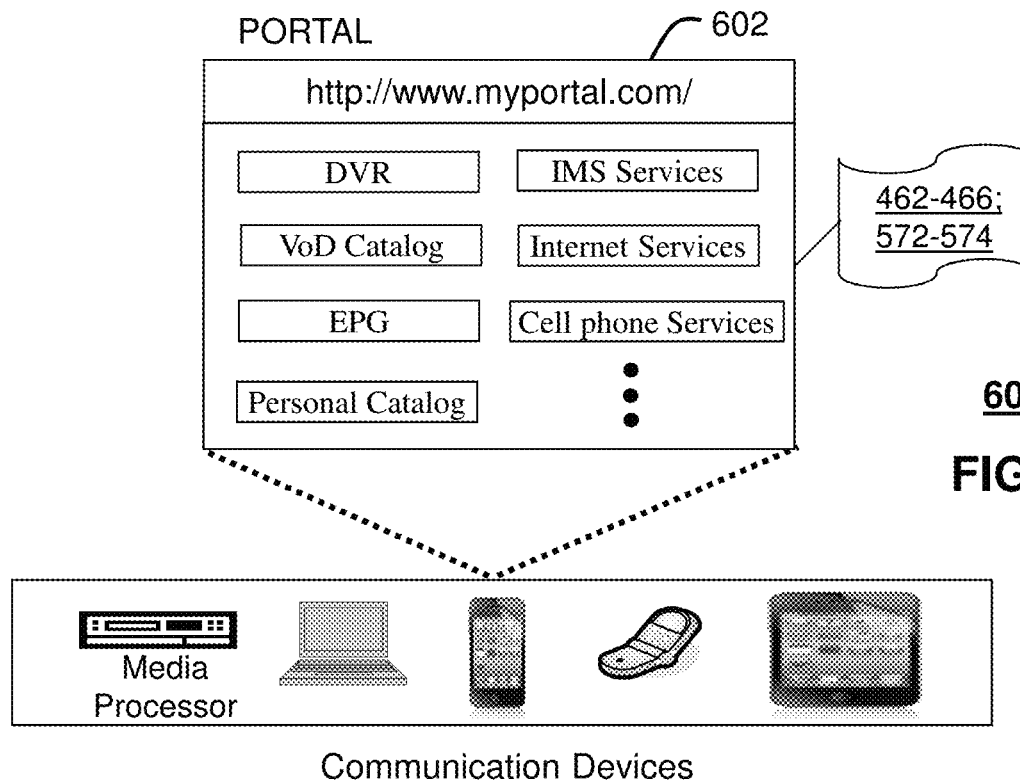
FIG. 6 depicts an illustrative embodiment of a web portal for interacting with the content delivery systems of FIGS. 1, 2A and B, and communication systems of FIGS. 4-5.

FIG. 6 depicts an illustrative embodiment of a web portal 602 of a communication system 600. Communication system 600 can be overlaid or operably coupled with systems 100, 200 and 201 of FIGS. 1, 2A and/or 2B, communication system 400, and/or communication system 500 as another representative embodiment of 100, 200 and 201 of FIGS. 1, 2A and/or 2B, communication system 400, and/or communication system 500. The web portal 602 can be used for managing services of 100, 200 and 201 of FIGS. 1, 2A and/or 2B and communication systems 400-500. A web page of the web portal 602 can be accessed by a Uniform Resource Locator (URL) with an Internet browser using an Internet-capable communication device such as the media processor 106 described in FIGS. 1, 2A and/or 2B and FIGS. 4-5. The web portal 602 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 602 can also be used for provisioning IMS services described earlier, provisioning Internet services, provisioning cellular phone services, and so on.

The web portal 602 can further be utilized to manage and provision software applications 462-466, and 572-574 to adapt these applications as may be desired by subscribers and/or service providers of systems 100, 200 and 201 of FIGS. 1, 2A and/or 2B, and communication systems 400-500. For instance, users of the services provided by content delivery network 130 or CDN 430 can log into their on-line accounts and provision the content delivery network 130 or CDN 430 with details of audio reproduction equipment 110 or sound enhancement settings described in connection with FIGS. 1-5, and so on. Service providers can log onto an administrator account to provision, monitor and/or maintain the systems 100, 200 and 201 of FIGS. 1, 2A and/or 2B or CDN 430.

Figure 7:
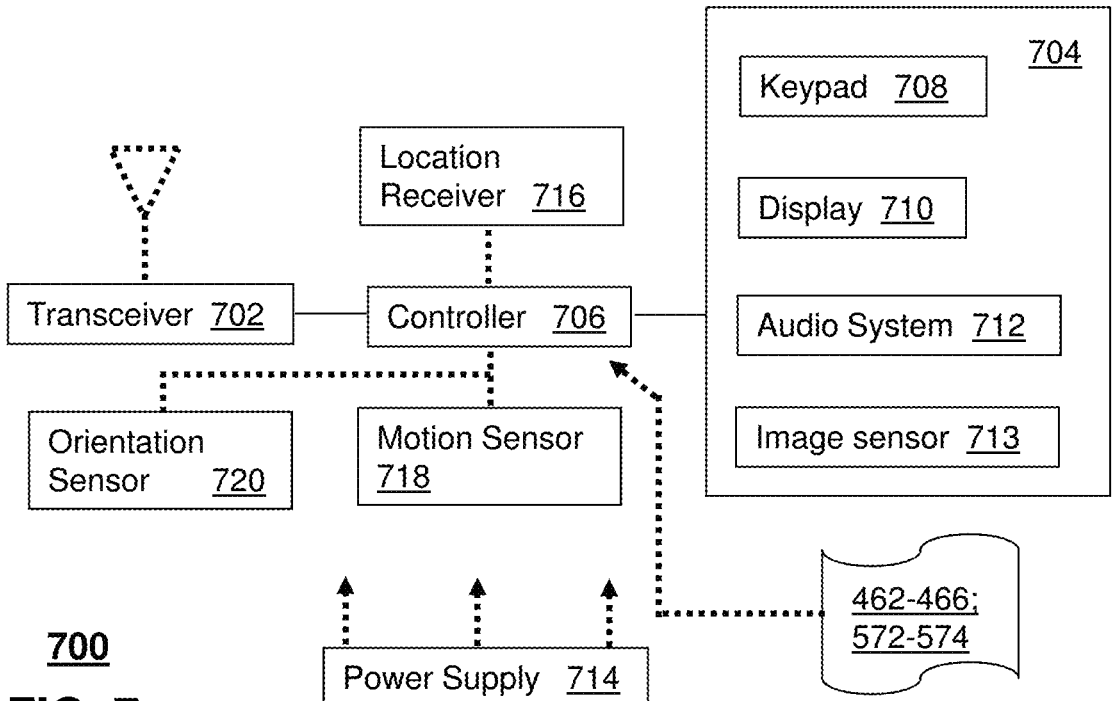
FIG. 7 depicts an illustrative embodiment of a communication device.

FIG. 7 depicts an illustrative embodiment of a communication device 700. Communication device 700 can serve in whole or in part as an illustrative embodiment of the devices depicted in FIGS. 1, 2A and/or 2B, and FIGS. 4-5 and can be configured to perform portions of method 300 of FIG. 3.

Communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface with graphical user interface (GUI) elements that can be selected by a user with a touch of a finger. The touch screen display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable applications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 700.

Other components not shown in FIG. 7 can be used in one or more embodiments of the subject disclosure. For instance, the communication device 700 can include a reset button (not shown). The reset button can be used to reset the controller 706 of the communication device 700. In yet another embodiment, the communication device 700 can also include a factory default setting button positioned, for example, below a small hole in a housing assembly of the communication device 700 to force the communication device 700 to re-establish factory settings. In this embodiment, a user can use a protruding object such as a pen or paper clip tip to reach into the hole and depress the default setting button. The communication device 700 can also include a slot for adding or removing an identity module such as a Subscriber Identity Module (SIM) card. SIM cards can be used for identifying subscriber services, executing programs, storing subscriber data, and so forth.

The communication device 700 as described herein can operate with more or less of the circuit components shown in FIG. 7. These variant embodiments can be used in one or more embodiments of the subject disclosure.

The communication device 700 can be adapted to perform the functions of media processor 106 of FIGS. 1, 2A and/or 2B, the media processor 406, the media devices 408, or the portable communication devices 416 of FIG. 4, as well as the IMS CDs 501-502 and PSTN CDs 503-505 of FIG. 5. It will be appreciated that the communication device 700 can also represent other devices that can operate in systems 100, 200 or 201 of FIGS. 1, 2A and/or 2B, communication systems 400-500 of FIGS. 4-5 such as a gaming console and a media player. In addition, the controller 706 can be adapted in various embodiments to perform the functions 462-466 and 572-574, respectively. For example, controller 706 can be adapted to execute a video streaming app to support the features of the disclosure, e.g., DIRECTV NOW™. Types of devices supported by the DIRECTV NOW™ app may include mobile phones, smart televisions, set-top boxes, over-the-top (OTT) clients, such as AppleTV,™ Amazon FireTV,™ Roku,™ or even a computer Web browser.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
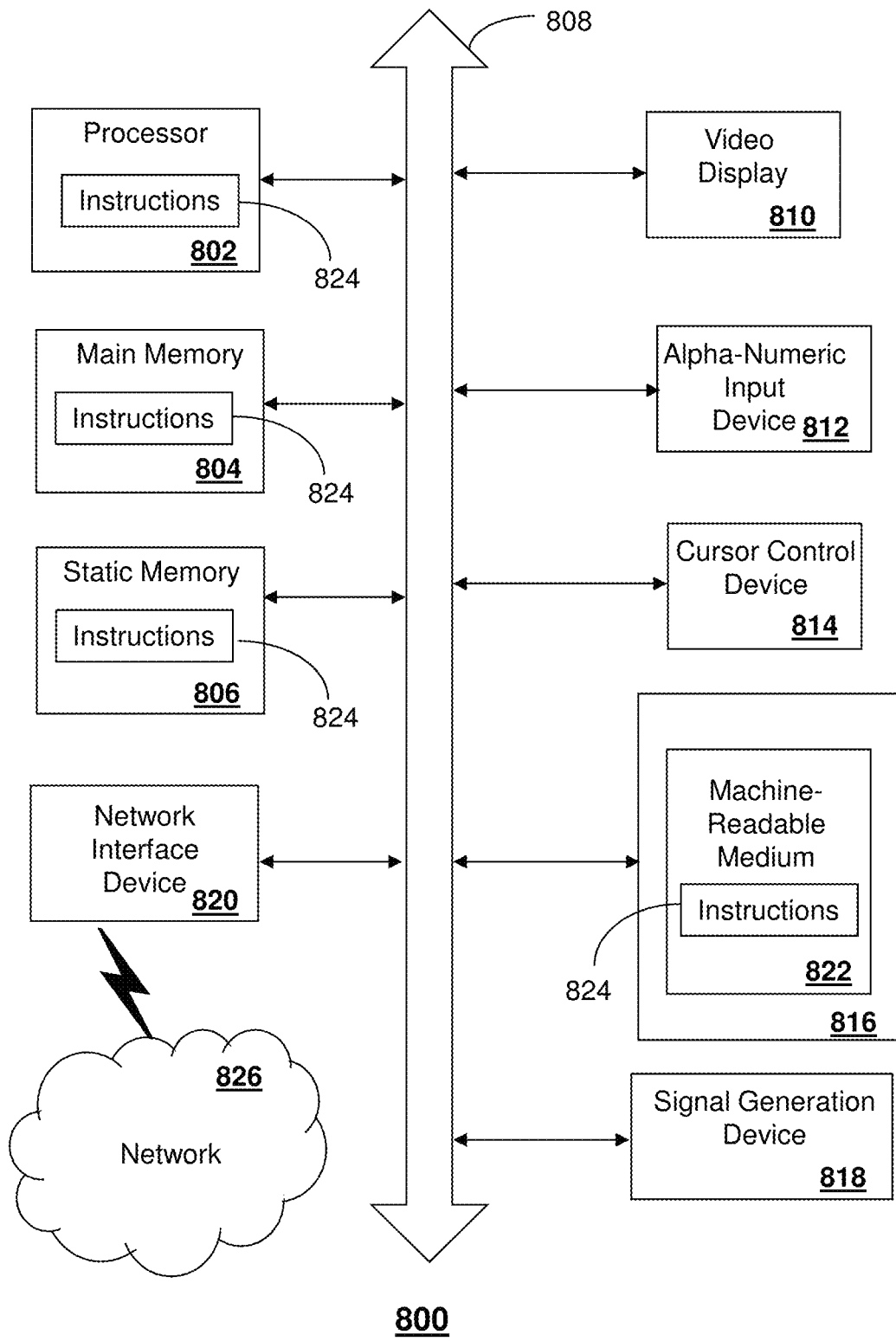
FIG. 8 is a diagrammatic representation of a machine in the form of a computer system within which a set of instructions, when executed, may cause the machine to perform any one or more of the methods described herein.

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the CDN 430, the media processor 106, the media processor 406 and other devices of FIGS. 1-5. In some embodiments, the machine may be connected (e.g., using a network 826) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU)), a graphics processing unit (GPU, or both), a main memory 804 and a static memory 806, which communicate with each other via a bus 808. The computer system 800 may further include a display unit 810 (e.g., a liquid crystal display (LCD), a flat panel, or a solid state display). The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, ZigBee®), and long-range communications (e.g., WiMAX, GSM, CDMA, LTE) can be used by computer system 800. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor, comprising:
a processing system including a processor; and
a memory that stores executable instructions that, when executed by the processing system, facilitate performance of operations, the operations comprising:
rendering audio signals that correspond to a point of view of a spherical audiovisual media content being displayed at a display device; and
modifying the audio signals based on a new field of view that corresponds to a request to change the point of view, wherein the new field of view of the spherical audiovisual media content is displayed at the display device, wherein the modifying includes enhancing a sound of one or more objects present in the new field of view, wherein the enhancing is based on an identification of types of audio content associated with the new field of view, and wherein the enhancing includes providing less sound enhancement for a first type of audio content identified in the new field of view relative to a second type of audio content identified in the new field of view.

2. The media processor of claim 1, wherein the spherical audiovisual media content comprises an ISO MPEG-4 container comprising video data, audio data, and metadata describing the video data and the audio data.

3. The media processor of claim 2, wherein the video data comprises a compressed, h.264 or h.265 video formats.

4. The media processor of claim 2, wherein the audio data comprises a compressed MPEG-AAC or MPEG-H or Dolby AC3/EAC3 or Dolby AC4 audio formats.

5. The media processor of claim 2, wherein the audio data comprises a first order Ambisonics or high order Ambisonics format combined with multiple audio objects.

6. The media processor of claim 1, wherein the operations further comprise:
receiving, from a remote control device coupled to the media processor, the request to change the point of view, resulting in the new field of view.

7. The media processor of claim 6, wherein the remote control device comprises a track pad, and wherein the processor comprises a plurality of processors operating in a distributed processing environment.

8. The media processor of claim 6, wherein the remote control device comprises up, down, left or right buttons, or a combination thereof.

9. The media processor of claim 6, wherein the remote control device comprises a track ball.

10. The media processor of claim 1, wherein the operations further comprise:

adapting the audio signals to audio reproduction equipment coupled to the media processor,
wherein the audio reproduction equipment comprises headphones.

11. The media processor of claim 1, wherein the operations further comprise:
adapting the audio signals to audio reproduction equipment coupled to the media processor,
wherein the audio reproduction equipment comprises a stereo or immersive sound bar.

12. The media processor of claim 1, wherein the operations further comprise:
adapting the audio signals to audio reproduction equipment coupled to the media processor,
wherein the audio reproduction equipment comprises a multichannel surround sound system.

13. The media processor of claim 1, wherein the operations further comprise:
adapting the audio signals to audio reproduction equipment coupled to the media processor,
wherein the audio reproduction equipment comprises built-in television speakers.

14. A non-transitory machine-readable storage medium, comprising executable instructions that, when executed by a media processor including a processor, facilitate performance of operations, the operations comprising:
rendering audio signals that correspond to a point of view of a spherical audiovisual media content being displayed at a display device; and
modifying the audio signals based on a new field of view that corresponds to a request to change the point of view, wherein the new field of view of the spherical audiovisual media content is displayed at the display device, wherein the modifying includes enhancing a sound of one or more objects present in the new field of view based on an identification of types of audio content associated with the new field of view, and wherein the enhancing includes providing less sound enhancement for a first type of audio content identified in the new field of view relative to a second type of audio content identified in the new field of view.

15. The non-transitory machine-readable storage medium of claim 14, wherein the processor comprises a plurality of processors operating in a distributed processing environment, and wherein the spherical audiovisual media content includes audio data comprising first order Ambisonics or high order Ambisonics format.

16. A method, comprising:
generating, by a media processor including a processor, audio signals corresponding to a point of view of a spherical audiovisual media content being displayed at a display device; and
modifying, by the media processor, the audio signals based on an identification of types of audio content associated with a new field of view that corresponds to a change to the point of view to enhance a sound of one or more objects present in the new field of view such that a first type of audio content identified in the new field of view is enhanced less relative to a second type of audio content identified in the new field of view.

17. The method of claim 16, further comprising:
adapting, by the media processor, the audio signals to audio reproduction equipment coupled to the media processor,
wherein the audio reproduction equipment comprises a multichannel surround sound system.

18. The method of claim 16, wherein the modifying of the audio signals to enhance the sound of one or more objects present in the new field of view is based on a user provided setting or value for sound enhancement through a user interface of the media processor.

19. The method of claim 16, wherein the first type of audio content includes dialogue and the second type of audio content includes ambient noise, wherein the dialogue is included on a center channel of a six channel surround format and the ambient noise is included on a left channel of the six channel surround format, a right channel of the six channel surround format, or a combination thereof.

20. The method of claim 19, wherein the modifying includes providing more sound enhancement for a third type of audio content identified in the new field of view relative to the first type of audio content identified in the new field of view, wherein the third type of audio content includes music, and wherein the music is included on a left surround channel of the six channel surround format, a right surround channel of the six channel surround format, a low frequency effects channel of the six channel surround format, or a combination thereof.

* * * * *